March 10, 1959 — G. S. KNOX — 2,876,986
GATE VALVE
Filed Aug. 23, 1956 — 2 Sheets-Sheet 1

GRANVILLE S. KNOX,
INVENTOR.

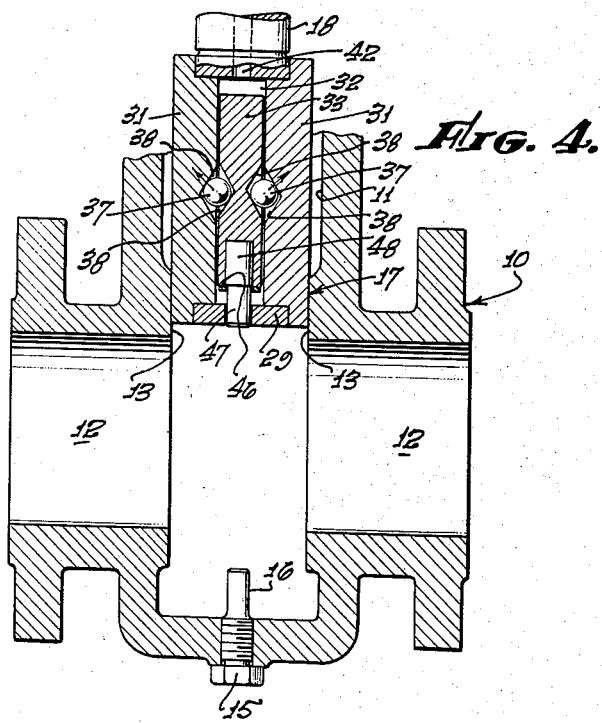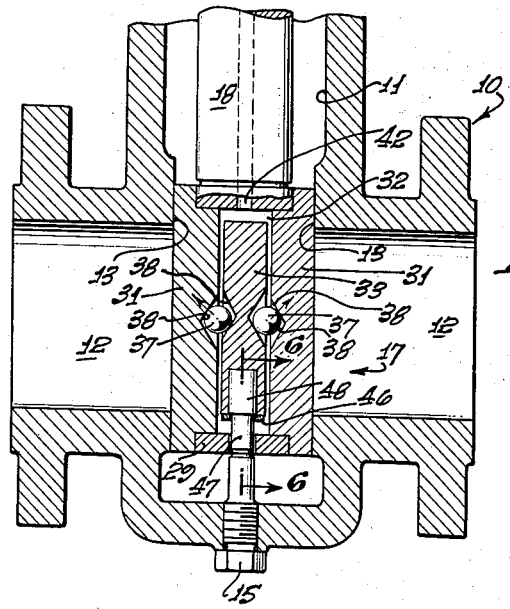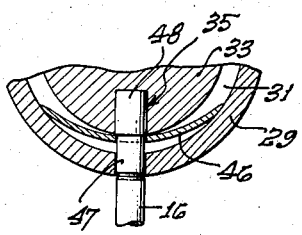

United States Patent Office 2,876,986
Patented Mar. 10, 1959

2,876,986
GATE VALVE

Granville S. Knox, Glendale, Calif., assignor to Hydril Company, Los Angeles, Calif., a corporation of Ohio Application August 23, 1956, Serial No. 605,869

4 Claims. (Cl. 251—200)

This invention relates generally to gate valves, and more particularly has to do with improvements in gate valves of the type wherein a valve stopper assembly is first freely moved into position to blank or close off fluid flow and thereafter a tight fitting metal-to-metal seal is established between the stopper assembly and the valve body, the improvements providing for a tight seal by low friction camming action of relatively few metal parts, none of which need be extremely accurately formed or machined for sealing operation.

Commenting briefly with regard to the construction of conventional gate valves in which stopper movement and final sealing action are accomplished as two separate steps, there is continuing need for a better operating valve of simple design which can be manufactured more economically particularly as respects the mechanical parts effecting final closing or sealing of the valve against flow pressure. This need is evidenced by difficulties encountered in operating valves of the type wherein a metal-to-metal seal is established by large surface area wedge fitting members, and by frequent malfunctioning of valves due to corrosion and rusting of close fitting movable metal parts, provided for sealing purposes, which cannot be readily lubricated or protected from exposure to fluids in the valve chamber.

The problem of machining the mating wedge faces on the stopper assembly, and the opposed faces of the valve body, with the extreme accuracy necessary to provide uniform pressural contact over the entire seating area is very difficult in conventional valves. What is needed is a valve capable of sealing with minimum friction between the wedging parts which also interact to establish a metal-to-metal seal of uniform tightness, as well as a reduced number of such members that interfit generally loosely and in a lubricated housing so that the useful life and ease of operation of the valve may be increased.

These purposes are served by the present invention through the provision of an improved valve containing an elongated valve chamber with inlet and outlet openings communicating with the chamber sides, a projection extending longitudinally into the chamber, and a stopper assembly movable longitudinally in the chamber toward and away from the projection for controlling flow through the valve, the stopper assembly including plates mounted for lateral displacement into pressural engagement with chamber wall portions bounding the openings and means including a roller or rollers between the plates operable in response to stopper engagement with the projection to transmit thrust acting to press the plates laterally into sealing engagement with the bounding chamber wall portions. Lateral thrust transmission through anti-friction rollers is accomplished by displacement of a member contacting the rollers in any direction in a plane extending between and substantially parallel to the plates, the roller or balls loosely mounting the member between the plates for such displacement.

Engagement of the projection with the displacement member upon downward movement of the stopper assembly to valve closing position operates to laterally displace the plates through the rollers for making the tight seal. Thus, the plates, member, rollers and projection are all loosely interfitting and operate together very simply, providing for long and reliable valve life. Also, the plates fit the plate carrier for guided lateral displacement while at the same time enclosing or protecting the wedging surfaces of the assembly from exposure to fluids within the valve, provision being made for injecting a viscous lubricant into the assembly to further seal and protect the wedging surfaces from exposure to fluids within the valve.

Other features and objects of the invention, as well as the details of an illustrative embodiment, will be more fully understood from the following detailed description of the drawings, in which:

Fig. 4 is a vertical section through a somewhat modified valve with the stopper assembly lifted out of flow blanking position;

Fig. 5 is a section similar to that of Fig. 4 showing the stopper assembly in flow blanking positions; and Fig. 6 is a section taken on line 6—6 of Fig. 5.

Figure 1:
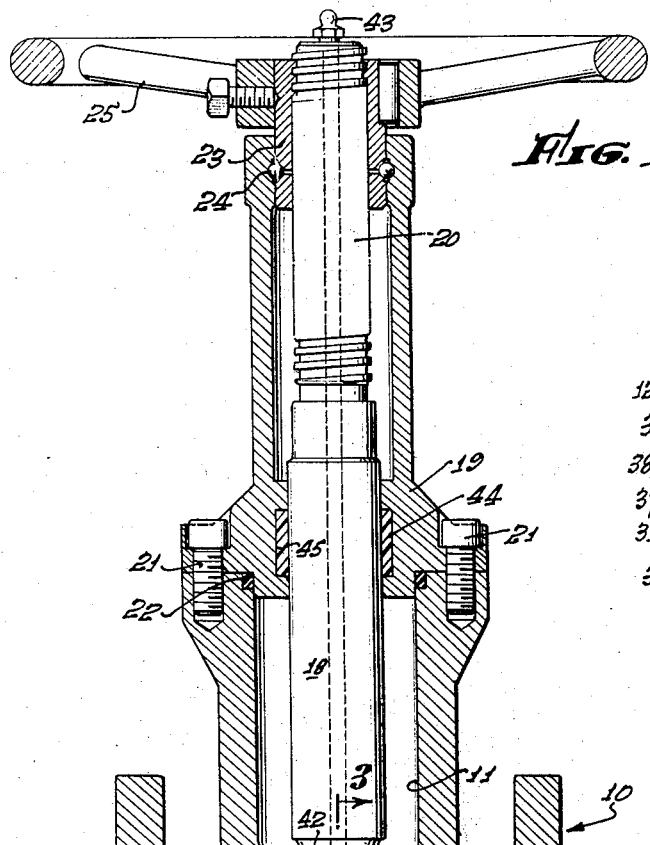
Fig. 1 is a vertical section through the valve showing the stopper assembly in flow blanking position within the valve chamber.

In Fig. 1 the valve body 10 forms an upright valve chamber 11 and a pair of coaxial cylindrical inlet and outlet openings 12 communicating with the chamber at its opposite planar sides or faces 13, which project a short distance into the chamber to provide annular valve assembly seating area spaced above the closed lower end 14 of the chamber. A plug 15 is threaded into the chamber lower end, with an integral relatively small diameter projection 16 carried by the plug extending longitudinally upwardly into the chamber from below the level of the openings 12, the projection terminating in the chamber in spaced relation to the openings and the lower end 14.

The valve stopper assembly 17 is moved longitudinally up and down in the chamber by displacement of shaft 18 extending upwardly through the upper portion of the chamber 11, and axially through bonnet 19, terminating in a threaded upper end 20. The bonnet is rigidly connected to the body 10 by screws 21, with compressed packing ring 22 sealing off therebetween.

A nut 23 mounted to rotate without axial displacement in the upper end of the bonnet by ball bearing 24 is threaded to the shaft, so that as the nut is turned by the handwheel 25 connected therewith the shaft will be longitudinally axially displaced to move the stopper assembly into and out of flow blanking position in chamber 11. Rotation of the shaft and stopper assembly relative to the body 10 is prevented by engagement of the carrier 29 with the chamber sides 13 between which the stopper assembly is freely movable up and down.

The ring shaped metal carrier 29 integral with the shaft 18 contains a bore 30 loosely supporting a pair of spaced upright circular metal plates 31 for lateral sliding displacement into and out of tight engagement with the chamber walls or faces 13 annularly bounding the openings 12. In the space 32 between the plates is another upright plate or block 33 fitted with an insert 35 projecting downward into a radial opening 36 through the carrier directly above the projection 16.

The block 33 is loosely centered in space 32 by a pair of central balls 37 fitted within pairs of opposite conical recesses 38 formed in opposed faces of the plates 31 and the block 33, the insert 35 in opening 36 preventing rotation of the block 33 about lateral axis 39 of the inlet and outlet passages. The balls 37 not only act to center the block but also transmit lateral thrust to plates 31 through low friction rolling contact therewith as the block is displaced in any direction in the upright plane thereof out of centered condition. Thrust is applied to the central axis of the plates 31 and they therefore bear against all portions of annular faces 13 with uniform pressure even when these faces are not machined exactly parallel with each other. As a result of the centralized thrust, and the relatively loose interfitting of the plates, some misalignment of the seating surfaces will not affect the capacity of the valve to seal.

Figure 2:
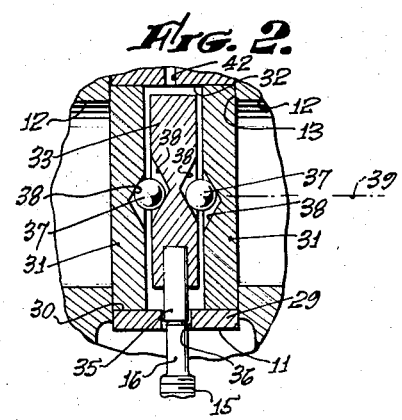
Fig. 2 is a fragmentary section showing the stopper assembly sealed against the valve chamber walls.

In operation, as the valve stopper assembly is displaced downward in the chamber 11 by handwheel actuation of shaft 18 to the flow blanking position shown in Fig. 1, the projection 16 is received in the carrier opening 36 and engages the insert 35, holding the latter and the block against further downward displacement relative to the carrier and plates 31. As seen in Fig. 2, the balls 37 are moved downwardly relative to the block 33 and laterally by continued plate downward displacement to thrust the plates 31 relatively laterally by rolling thrust transferring engagement with opposite plate and block recess shoulders angled downwardly and laterally toward the openings 12, the looseness or slack being fully taken up when the plates 31 annularly engage the bounding walls 13. Thrust is applied approximately to the central axes of the plates, and as a result they engage the walls 13 with uniformly distributed pressure, even though these walls may not be machined in exact parallel relation. Further rotation of the handwheel tightens the metal-to-metal seal across the plates and bounding walls with the minimum friction of rolling contact between the balls and the angled recess shoulders, so that the wedging fit never becomes self-locking and is immediately released by opposite rotation of the hand wheel, even though the conical recess walls are angled by as little as 10° from a plane parallel with faces 13.

For maintaining the balls 37 and block 33 in properly lubricated condition, viscous lubricant is introduced into space 32 between the plates 31 through a bore 42 communicating between a lubricant fitting 43 at the exposed end of the shaft and the space 32. Lubricant fitting 43 is provided with a check valve to prevent back flow of lubricant through bore 42. Since the plates 31 are fitted to slide within carrier bore 30, the lubricant is retained in the space 32, protecting the balls and incliined surfaces 38 from exposure to fluids in the valve passages 12 and chamber 11. Fluid pressure is prevented from leaking between the shaft 18 and bonnet 19 by injected plastic packing material 44 in the annular bonnet cavity 45 exposed to the shaft.

Figure 3:
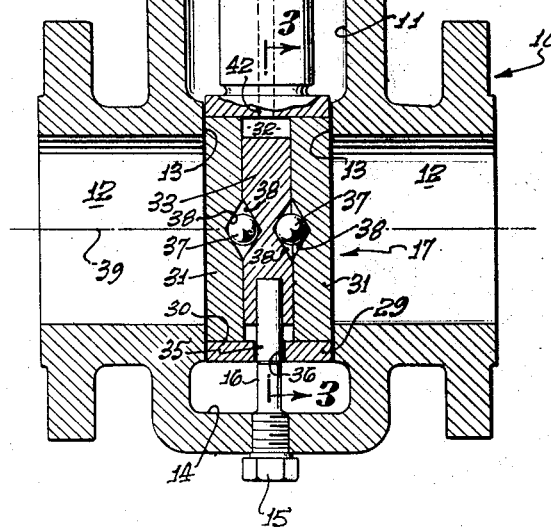
Fig. 3 is a section taken on line 3—3 of Fig. 1.
Figure 3:
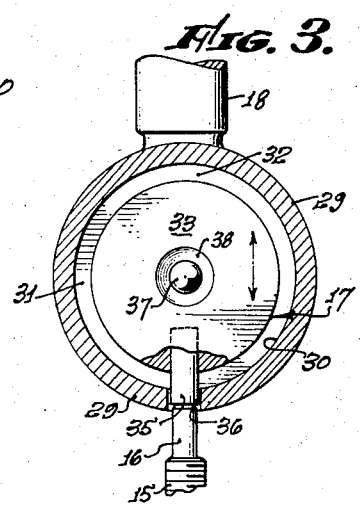

Referring now to Figs. 4 through 6 showing a slightly modified valve stopper assembly, and in which the same numbers are applied to the elements as in Figs. 1 through 3, it will be seen that the plates 31 are held in constant engagement with chamber wall portions 13 throughout up and down stopper displacement by a compression spring, preferably though not necessarily the leaf spring 46, positioned in space 32 and urging the block 33 upwardly in the same direction as it is urged upon contact of the insert 35 with the projection 16. The spring is also fitted over the reduced lower portion 47 of the insert to press upwardly against its enlarged upper portion 48, holding the insert loosely in the block so that it need not be press fitted into the block as in Fig. 1.

Sliding action of the plates held in constant contact against chamber wall portions 13, acts to scrape sediment or other accumulation off these walls as the stopper assembly is moved up and down in passage traversing relation. As seen in Fig. 4, the plates are continuously pressed laterally by spring thrust exerted on the block displacing the latter upwardly relative to the plates so that the balls 37 are rolled relatively downwardly on the inclined surfaces forming recesses 38 and transmit lateral thrust to the plates. When the stopper assembly is brought downward into engagement with projection 16, as shown in Fig. 5, the block is held against further downward displacement with the carrier 29 and plates 31, thereby effecting a tight sealing condition of the plates against chamber wall portions 13 as the carrier is further slightly displaced downwardly through continued very slight outward wedging of the balls and plates by the block.

I claim:

1. An improved gate valve, comprising a body forming an upright valve chamber having inlet and outlet openings in the sides thereof for flowing fluid therethrough and a closed lower end, a projection extending upwardly into the chamber from said lower end, and a valve stopper assembly movable up and down in the chamber above said projection for controlling said flow, said assembly including a pair of laterally spaced discs respectively movable with the assembly into positions opposite said openings, a carrier ring having a transverse bore and supporting said discs therein in upright condition for lateral bodily displacement relative to the carrier ring into sealing engagement with chamber wall portions bounding said openings and an elongated upright stem integral with said ring for moving it up and down in said chamber, a single upright plate member fitted in the space between said discs and movable in a plane substantially parallel to the discs and relative thereto during valve assembly engagement with said projection, said member and discs having complementary conical ramps sunk in laterally facing sides thereof, and balls carried between said complementary ramps and operable to transmit thrust acting to urge the discs laterally into sealing engagement with said wall portions in response to relative movement of said member substantially parallel to said discs, said member transmitting lateral thrust acting through the balls during said stopper assembly displacement relative to the projection to keep the discs in sliding engagement with said wall portions, said complementary ramps engaging the balls adapting them to roll therealong during said member and disc relative movement, said ramps forming conical recesses having lateral axes and said ramps intersecting vertical planar sides of said discs and plate member at circular loci the diameters of which are substantially greater than the diameters of said balls.

2. The invention as defined in claim 1 in which said carrier ring and discs form an enclosed space within which said balls and plate member are received, said carrier ring has an aperture extending vertically through the lower extent thereof above said projection, and said assembly includes a part received in said aperture and operable upon downward seating of said part on said projection to limit downward travel of said plate member with said carrier ring and discs.

3. The invention as defined in claim 2 including a spring in said space between the ring and plate and urging the plate vertically upwardly keeping the balls pressing laterally against the plates for urging the plates against said chamber wall portions throughout stopper assembly movement above said projection.

4. The invention as defined in claim 2 in which said integral ring and stem contain an interior passage communicating from outside the chamber to said enclosed space and through which viscous lubricant may be supplied to said space for lubricating said balls and ramps.

References Cited in the file of this patent

UNITED STATES PATENTS

| | | |
|---|---|---|
| 1,476,862 | Wagner | Dec. 11, 1923 |
| 1,689,799 | Nordstrom | Oct. 30, 1928 |
| 2,151,596 | Halle | Mar. 21, 1939 |
| 2,639,882 | Conrad | May 26, 1953 |
| 2,776,813 | Blackman | Jan. 8, 1957 |

FOREIGN PATENTS

| | | |
|---|---|---|
| 108,311 | Australia | Dec. 27, 1927 |
| 735,816 | France | Sept. 6, 1932 |
| 605,550 | Germany | Nov. 13, 1934 |
| 783,861 | France | Apr. 15, 1935 |
| 950,027 | France | Mar. 14, 1949 |
| 1,037,656 | France | May 6, 1953 |